United States Patent [19]

Kondo et al.

[11] 4,054,472
[45] Oct. 18, 1977

[54] ALKALI-RESISTANT COMPOSITIONS FOR FORMING GLASS FIBERS

[75] Inventors: Masahiro Kondo; Suguru Takehara; Tsutomu Mitsufuji; Moritosi Sasaki; Tomoji Takura, all of Mouka, Japan

[73] Assignee: Fuji Fibre Glass Company, Ltd., Tokyo, Japan

[21] Appl. No.: 687,746

[22] Filed: May 19, 1976

[30] Foreign Application Priority Data

May 23, 1975 Japan .................................. 50-61087

[51] Int. Cl.$^2$ .......................... C03C 13/00; C03C 3/04
[52] U.S. Cl. ...................................... 106/52; 106/50; 106/99
[58] Field of Search ............................. 106/52, 50, 99

[56] References Cited

U.S. PATENT DOCUMENTS

| 2,877,124 | 3/1959 | Welsh | 106/50 |
| 3,840,379 | 10/1974 | Wolf | 106/52 |
| 3,861,926 | 1/1975 | Irlam et al. | 106/52 |
| 3,861,927 | 1/1975 | Kimura et al. | 106/52 |
| 3,928,049 | 12/1975 | Otouma et al. | 106/52 |
| 3,973,974 | 8/1976 | Otouma et al. | 106/99 |

Primary Examiner—Winston A. Douglas
Assistant Examiner—Mark Bell
Attorney, Agent, or Firm—William J. Daniel

[57] ABSTRACT

Alkali-resistant compositions for forming glass fibers characterized by comprising, in molecular weight percentage, 58–77% of $SiO_2$, 4–11% of $ZrO_2$, 16–24% of an alkali metal oxide and 0.5–3.5% of at least one oxide selected from the group consisting of oxides of iron and oxides of copper, with the proviso that the molecular weight percentages of the oxides of iron and the oxides of copper are calculated in terms of the chemical formulas $Fe_2O_3$ and CuO, respectively. Alkali-resistant compositions for forming glass fibers characterized by comprising in molecular weight percentage, 56–74% of $SiO_2$, 4–6.9% of $ZrO_2$, 11–20% of an alkali metal oxide, 0.5–3.5% of at least one oxide selected from the group consisting of oxides of iron and oxides of copper with the proviso that the molecular weight percentages of the oxides of iron and the oxides of copper are calculated in terms of the chemical formulas $Fe_2O_3$ and CuO, respectively, and up to 12% of an alkaline earth metal oxide.

11 Claims, No Drawings

ALKALI-RESISTANT COMPOSITIONS FOR FORMING GLASS FIBERS

BACKGROUND OF THE INVENTION

The present invention relates to a composition useful for forming glass fibers which possesses high alkali-resistance and are capable of being easily vitrified or fiberized.

In general, high alkali-resistance is required for glass fibers utilized for reinforcing cementitious products of a high alkali content, such as Portland cement and alumina cement, and alkali-resistant compositions having a variety of chemical compositions have been developed hitherto for manufacturing alkali-resistant glass fibers. For example, British Patent 1,290,528 discloses an alkali-resistant composition for forming glass fibers which contains a large amount of $ZrO_2$. The alkali-resistant composition disclosed in this patent is excellent in alkali-resistance but is hardly vitrified. Moreover, this composition involves a problem, namely difficulty in fiberizing the composition into fibers because of its high spinning temperature. On the other hand an alkali-resistant composition disclosed in U.S. Pat. No. 3,861,925 which contains $TiO_2$ and $ZrO_2$ and is useful for forming glass fibers is easily fiberized because of its low spinning temperature but is not sufficiently high in alkali-resistance.

As a result of various research made to solve these problems, it has now been found that a composition for forming glass fibers possessing high alkali-resistance which can easily be vitrified and fiberized can be obtained by incorporating in a glass composition of $SiO_2$-$ZrO_2$-alkali metal oxide series at least one oxide of iron and/or oxide of copper.

BRIEF SUMMARY OF THE INVENTION

In accordance with the present invention, therefore, there is provided an alkali-resistant composition for forming glass fibers which in its broad aspect consist essentially of, in molecular weight percentage, 58–77% of $SiO_2$, 4–11% of $ZrO_2$, 16–24% of at least one of alkali metal oxides and 0.5–3.5% of at least one oxide selected from the group consisting of oxides of iron and oxides of copper with the proviso that the molecular weight percentages of the oxides of iron and the oxides of copper are calculated in terms of the chemical formulas $Fe_2O_3$ and $CuO$, respectively.

It is an object of the present invention to provide an alkali-resistant composition for forming glass fibers which is capable of being easily vitrified and fiberized.

It is another object of the present invention to provide an alkali-resistant composition for forming glass fibers which has a lowered spinning temperature by reducing the viscosity of the fused glass.

It is further object of the present invention to provide an alkali-resistant composition for forming glass fibers which exhibit excellent properties as a reinforcement for cementitious products of high alkali content, such as Portland cement and alumina cement.

Other and further objects, features and advantages of the present invention will appear more fully from the following description.

DETAILED DESCRIPTION OF THE INVENTION

The present invention will now be explained with reference to a preferred embodiment thereof.

In the composition of the present invention, $SiO_2$ is used in an amount of 58–77%, preferably 63–75% by molecular weight. If the content of $SiO_2$ is less than 58% by molecular weight, the glass will tend to be easily devitrified and at the same time high alkali-resistance can no longer be expected. On the other hand, if the content of $SiO_2$ is more than 77% by molecular weight, the composition will hardly be vitrified.

In the composition of the present invention, $ZrO_2$ is used in an amount of 4–11%, preferably 6–10% by molecular weight. If the content of $ZrO_2$ is less than 4% by molecular weight, high alkali-resistance cannot be expected for the product. On the other hand, if the content of $ZrO_2$ is more than 11% by molecular weight, the composition will hardly be vitrified.

Examples of the alkali metal oxides used in the composition of the present invention include $Na_2O$, $K_2O$ and the like. The alkali metal oxides are used in an amount within a range of 16–24%, preferably 17–22% by molecular weight. If the content of the alkali metal oxide is less than 16% by molecular weight, the composition can hardly be vitrified and at the same time can hardly be fiberized. If the content is more than 24%, however, high alkali-resistance can no longer be expected.

Any of the oxides of Fe(II), Fe(III) and Fe(V) or a mixture thereof can be used as the oxides of iron for the composition of the present invention. Illustrative of the oxides of iron usually utilized are FeO, $Fe_2O_3$ and $Fe_3O_4$. Examples of the oxide of copper include oxides of Cu(I) and Cu(II).

By incorporating in the composition for forming glass fibers at least one oxide of iron and or oxide of copper according to the present invention, the following remarkable effects can be achieved:

1. Processing to glass is facilitated.
2. The viscosity of the fused glass is reduced thereby lowering the spinning temperature.
3. The alkali-resistance is enhanced. (By this effect, it is possible to decrease the content of $ZrO_2$. As will be explained hereinafter, this effect is especially remarkable in an alkaline solution containing calcium hydroxide.)

The oxides of iron and the oxides of copper exhibiting such remarkable effects are used singly or together in an amount of 0.5–3.5%, preferably 1–3.0% by molecular weight in terms of $Fe_2O_3$ or CuO. If the content of the oxides of iron and/or oxide of copper is less than 0.5% by molecular weight, the effects for facilitating vitrification, lowering the spinning temperature and enhancing the alkali-resistance will seriously be reduced. On the other hand, if the amount exceeds 3.5% by molecular weight, coloration of the glass will become significant and the effect for enhancing the alkali-resistance will be reduced. Accordingly, it is necessary to use the oxides of iron and/or the oxides of copper in an amount within the above defined range.

According to another embodiment of the present invention, at least one alkaline earth metal oxide such as CaO, MgO and the like can be used in addition to the aforementioned components to obtain a glass composition for forming glass fibers which is also characterized by the same excellent alkali-resistance as in the above mentioned embodiment. In this embodiment, the use of an alkaline earth metal oxide in an amount up to 12% by molecular weight serves to enhance the resistance of the resulting glass fibers to an alkaline solution of the sodium or potassium hydroxide series. As the use of such alkaline earth metal oxide tends to elevate the liquidus temperature of the glass, it is possible to decrease the amount of $ZrO_2$ in proportion to the amount of the alkaline earth metal oxide used. In this case, the content of the alkali metal oxide should also be decreased in conformity with decrease in the amount of $ZrO_2$ to keep the high resistance to alkali.

In accordance with this embodiment, therefore, there is provided an alkali-resistant composition for forming glass fibers which comprises, in molecular weight percentage, 56–74% of $SiO_2$, 4–6.9% of $ZrO_2$, 11–20% of an alkali metal oxide, 0.5–3.5% of an alkaline earth metal oxide. In this composition for forming glass fibers, a preferred proporation range for the components is, in molecular weight percentage, 61–72% of $SiO_2$, 5.5–6.5% of $ZrO_2$ 13–18% of an alkali metal oxide, 1–3% of oxides of iron and/or oxides of copper, and up to 8% of an alkaline earth metal oxide.

The glass composition for forming glass fibers thus obtained is highly alkali-resistant and is easily vitrified and fiberized.

In the preparation of the compositions of the present invention, the glass making constituents are often contaminated with alumina ($Al_2O_3$) as an impurity. As the glass composition of a high alumina content is hardly vitrified and tends to deteriorate resistance to alkali, it is desirable to avoid the constituents contaminated with $Al_2O_3$. In case the constituents selected for a particular composition are unavoidably contaminated with $Al_2O_3$, it is desirable to select the constituents so carefully that the content of $Al_2O_3$ in the glass is at most 4% by molecular weight.

To further illustrate this invention, and not by way of limitation, the following Examples are given.

EXAMPLES a. Preparation of a glass composition, tests for alkali-resistance, and like properties A mixture of $SiO_2$, $ZrO_2$, $Na_2O$, $K_2O$, $Fe_2O_3$ and CuO in a given proportion was molten in an electric furnace at 1450° C for 3 hours and then cooled down to room temperature. The glass composition was examined for alkali-resistance and the molten state. Measurement of the viscosity of molten glass was also made. The conditions for preparation of the glass compositions and the results of these tests performed for Experiments Nos. 1–12 are shown in Table 1. For the purpose of comparison, the results of tests obtained for the Comparative Example and "E-glass" (comprised, in molecular weight percentage, of 56.3% of $SiO_2$, 7.6% of $B_2O_3$, 20.1% of CaO, 6.3% of MgO, 9.2% of $Al_2O_3$ and 0.5% of $Na_2O$) are also shown in Table 1. The Comparative Example is an example of the known glass which is excellent in alkali-resistance but has a high spinning temperature or in other words is inferior in fiberization, while "E-glass" is an example of the known glass which has a low spinning temperature but is inferior in alkali-resistance.

In this Example, the tests for alkali-resistance were performed according to the following methods:

1. The method for examining alkali-resistance in 1-N NaOH solution

A glass powder pulverized to a particle size of 35–60 mesh is dipped for 24 hours in 1 N NaOH solution maintained at 80° C. Loss in weight (%) of the glass powder in this case is an indication of the alkali-resistance.

2. The method for examining alkali-resistance in a cement extraction liquid

To 1 Kg of Portland cement are added 3 Kg of water. The mixture is well stirred and allowed to stand for 1 hour. The supernatant liquid is separated by filtration and used as an alkaline solution (pH = 13.5) for the test. 4 Grams of a glass powder of 35–60 mesh are immersed for 10 days in 100 ml of this testing alkaline solution warmed at 80° C. Loss in weight (%) of the glass powder is an indication of alkali-resistance.

In this Example, the measurement of the viscosity of molten glass was carried out by using a high temperature viscosimeter Model $VAP_1$-H (Cho Keiryoki Seisakusho). The procedure for examining the molten state of the glass was carried out by placing 20 g of the glass composition in a platinum crucible of 100 ml in capacity, maintaining the crucible at 1500° C for 1 hour and visually evaluating the molten state of the glass with the naked eye. In Table 1, the symbol "O" stands for very good molten state, the symbol "Δ" for relatively good molten state and the symbol "X" for bad molten state.

Table 1

| Exp. No. | | 1 | 2 | 3 | 4 | 5 | 6 | 7 | 8 | 9 | 10 | 11 | 12 | Comparative Example 1 |
|---|---|---|---|---|---|---|---|---|---|---|---|---|---|---|
| Constituents of Glass (in molecular weight percentage) | $SiO_2$ | 73.1 | 72.4 | 70.8 | 71.5 | 70.0 | 67.0 | 70.0 | 68.5 | 68.5 | 69.0 | 69.0 | 68.5 | 68.7 |
| | $ZrO_2$ | 5.3 | 7.6 | 5.3 | 8.9 | 10.0 | 8.9 | 8.7 | 8.9 | 9.0 | 8.7  8.8 | 8.6 | 9.2 | |
| | $Na_2O$ | 20.0 | 18.3 | 22.3 | 16.5 | 16.7 | 22.4 | 20.4 | 20.0 | 19.0 | 20.6 | 20.7 | 20.3 | 16.1 |
| | $K_2O$ | — | — | — | 1.4 | 1.5 | — | — | — | — | — | — | — | — |
| | $Fe_2O_3$ | 1.6 | 1.7 | 1.6 | 1.7 | 1.8 | 1.7 | 0.9 | 2.6 | 3.5 | 1.7 | 1.3 | — | — |
| | CuO | — | — | — | — | — | — | — | — | — | — | 0.2 | 2.6 | — |
| | $Al_2O_3$ | — | — | — | — | — | — | — | — | — | — | — | — | 1.3 |
| | CaO | — | — | — | — | — | — | — | — | — | — | — | — | 4.7 |
| Alkali-resistance test | Percent loss in weight in NaOH solution | 1.50 | 0.60 | 1.52 | 0.31 | 0.25 | 0.60 | 0.51 | 0.53 | 0.68 | 0.53 | 0.51 | 0.50 | 0.07 |
| | Percent loss in weight in cement extraction liquid | 0.54 | 0.28 | 0.63 | 0.24 | 0.16 | 0.26 | 0.47 | 0.35 | 0.61 | 0.31 | 0.32 | 0.55 | 0.74 |
| | Temperature (° C) at which the viscosity is $10^{3.2}$ poise | 1245 | 1290 | 1195 | 1315 | 1310 | — | — | — | — | 1267 | 1257 | — | 1331 |
| | Molten state of glass | Δ | Δ | | | | | | | | | | | × |

Comparative Example column also shows E-Glass values: NaOH 3.20; cement 1.96; Temperature 1203.

As are evident from Table 1, the glass compositions of Exp. Nos. 1–12 which show free from an alkaline earth metal oxide are, even in the case of a low $ZrO_2$ content, only a small loss in weight in the cement extraction liquid, as compared with the glass composition of the Exp. No. 1 and E-glass in Comparative Example, thus showing the superiority in alkali-resistance of the glass composition of the present invention with respect to an alkaline solution containing calcium hydroxide. The glass compositions of Exp. Nos. 1–12 are not only good in the molten state but also low in the temperature at which the viscosity shows $10^{3.2}$ poise, as compared with the alkali-resistant glass composition of No. 1 in Comparative Example, thus showing easiness in fiberization.

Glass compositions which contain CaO or MgO in addition to the above defined constituents were examined in a series of tests in the same manner as described the above for Exp. Nos. 1–12. Table 2 shows the chemical compositions and the results of the tests.

Table 3

| Glass composition for forming glass fibers | | Percent retention of tensile strength | | |
|---|---|---|---|---|
| | | After 24 hours | After 48 hours | After 72 hours |
| Examples | Exp. No. 10 | 85.4 | 72.2 | 50.3 |
| " | 11 | 82.2 | 70.5 | 48.1 |
| " | 16 | 77.1 | 66.3 | 40.3 |
| " | 24 | 76.2 | 65.1 | 40.2 |
| Comparative Example | " 1 | 79.3 | 67.3 | 40.2 |
| | E-glass 24.8 | 7.7 | 7.1 | |

As are evident from the table, the glass compositions of Exp. Nos. 10, 11, 16 and 24 are equivalent or superior in alkali-resistance to the glass composition of Exp. No. 1 in comparative Example and are far higher in alkali-resistance than E-glass.

Having described several specific embodiment of our

Table 2

| Exp. No. | | Example | | | | | | | | | | | | Comparative Example |
|---|---|---|---|---|---|---|---|---|---|---|---|---|---|---|
| | | 13 | 14 | 15 | 16 | 17 | 18 | 19 | 20 | 21 | 22 | 23 | 24 | 1 |
| Constituents of glass (in molecular weight percentage) | $SiO_2$ | 64.5 | 61.8 | 68.0 | 69.1 | 70.0 | 71.2 | 67.0 | 67.2 | 68.0 | 69.6 | 68.1 | 68.8 | 68.7 |
| | $ZrO_2$ | 6.3 | 6.5 | 6.2 | 6.3 | 6.4 | 6.5 | 5.2 | 4.2 | 6.1 | 5.2 | 5.1 | 6.3 | 9.2 |
| | $Na_2O$ | 15.9 | 16.3 | 15.7 | 15.9 | 16.2 | 16.4 | 15.5 | 15.5 | 13.5 | 9.7 | 14.2 | 15.8 | 16.1 |
| | $K_2O$ | — | — | — | — | — | — | — | — | — | 3.4 | — | — | — |
| | $Fe_2O_3$ | 1.6 | 3.4 | 0.8 | 1.7 | 2.5 | 3.4 | 0.8 | 1.6 | 0.8 | — | — | 1.2 | — |
| | CuO | — | — | — | — | — | — | — | — | — | 1.7 | 1.7 | 0.7 | — |
| | CaO | 11.7 | 12.0 | 9.3 | 7.0 | 4.9 | 2.5 | 11.5 | 11.5 | 11.6 | 10.4 | 7.9 | 7.2 | 4.7 |
| | MgO | — | — | — | — | — | — | — | — | — | — | 3.0 | — | — |
| | $Al_2O_3$ | — | — | — | — | — | — | — | — | — | — | — | — | 1.3 |
| Alkali resistance test | Percent loss in weight in NaOH solution | 0.07 | 0.48 | 0.15 | 0.10 | 0.20 | 0.71 | 0.12 | 0.07 | 0.08 | 0.38 | 0.35 | 0.10 | 0.07 3.20 |
| | Percent loss in weight in cement extraction liquid | 0.60 | 0.98 | — | 0.40 | 0.55 | 0.60 | — | 0.82 | — | — | — | 0.41 | 0.74 1.96 |
| | Temperature (° C) at which the viscosity is $10^{3.2}$ poise | 1179 | 1145 | 1237 | 1249 | 1255 | 1262 | 1196 | 1167 | 1245 | 1187 | 1183 | 1244 | 1331 1203 |
| | Molten state of glass | | | | | | | | | | | | | × |

Table 2 obviously shows that the glass compositions of Exp. Nos. 13–24 are, in spite of their low $ZrO_2$ content, adjacent to only a small loss in weight in the cement extraction liquid, as compared with the alkali-resistant glass composition of in Comparative Example 1, thus showing the superiority in alkali-resistance of the glass composition of the present invention with respect to an alkaline solution containing calcium hydroxide. As the glass compositions of Exp. Nos. 13–24 are extremely low in the temperature at which the viscosity shows $10^{3.2}$ poise, it is possible to lower the spinning temperature. It was also observed that these glass compositions are good in the molten state.

b. Preparation of glass fibers

The glass compositions of Exp. Nos. 10, 11, 16 and 24 in Examples were fiberized at spinning temperatures of 1267° C, 1257° C, 1249° c and 1244° C, respectively, to form glass fibers of 13 × 10$^{-3}$ mm in an average filament diameter. Similarly, the glass composition of Exp. No. 1 and E-glass in comparative Example were fiberized at spinning temperatures of 1331° C and 1203° C, respectively, to form glass fibers of 13 × 10$^{-3}$ mm in an average filament diameter. These glass fibers were dipped into the cement extraction liquid kept at 80° C and tensile strength of these fibers was measured at given time intervals. The following table shows change in tensile strength of the glass fibers with the lapse of time.

invention, it is believed obvious that modification and variation of our invention are possible in addition to those already suggested in the light of the above teachings without departure from the spirit of this invention.

What is claimed is:

1. An alkali-resistant composition for forming glass fibers consisting essentially of, by molecular weight percentage, 58–77% of $SiO_2$, 4–11% of $ZrO_2$, 16–24% of at least one of alkali metal oxides and 0.5–3.5% of at least one oxide selected from the group consisting of an oxide of iron and an oxide of copper, with the proviso that the molecular weight percentages of the oxide of iron and oxide of copper are calculated in terms of the chemical formulas $Fe_2O_3$ and CuO, respectively.

2. An alkali-resistant composition according to claim 1, which consists essentially of, by molecular weight percentage, 63–75% of $SiO_2$, 6–10% of $ZrO_2$, 17–22% of at least one of alkali metal oxides and 1–3 % of at least one oxide selected from the group consisting of an oxide of iron and an oxide of copper.

3. An alkali-resistant composition according to claim 1 wherein said alkali metal oxide is sodium oxide.

4. An alkali-resistant composition according to claim 1, which consists essentially of, by molecular weight percentage, 68–70% of $SiO_2$, 8–10% of $ZrO_2$, 19–21% of $Na_2O$, and 1–3% of an oxide of iron.

5. An alkali-resistant composition according to claim 1, which consists essentially of, by molecular weight percentage, 68–70% of $SiO_2$, 8–10% of $ZrO_2$, 19–21% of $Na_2O$, 1–2% of an oxide of iron and 0.1–0.6% of an oxide of copper.

6. An alkali-resistant composition for forming glass fibers consisting essentially of, by molecular weight percentage, 56–74% of $SiO_2$, 4–6.9% of $ZrO_2$, 11–20% of at least one of alkali metal oxides, 0.5–3.5% of at least one oxide selected from the group consisting of an oxide of iron and an oxide of copper, with the proviso that the molecular weight percentages of the oxide of iron and the oxide of copper are calculated in terms of the chemical formulas $Fe_2O_3$ and $CuO$, respectively, and up to 12% of at least one alkaline earth metal oxide.

7. An alkali-resistant composition according to claim 6, which consists essentially of, by molecular weight percentage, 61–72% of $SiO_2$ 5.5–6.5% of $ZrO_2$, 13–18% of at least one of alkali metal oxides, 1–3% of at least one oxide selected from the group consisting of an oxide of iron and an oxide of copper, and up to 8% of at least one alkaline earth metal oxide.

8. An alkali-resistant composition according to claim 6 wherein said alkali metal oxide is sodium oxide.

9. An alkali-resistant composition according to claim 6, wherein said alkaline earth metal is CaO.

10. An alkali-resistant composition according to claim 6, which consists essentially of, by molecular weight percentage, 68–70% of $SiO_2$, 5.5–6.5% of $ZrO_2$, 15–17% of $Na_2O$, 1–3% of an oxide of iron and 6–8% of CaO.

11. An alkali-resistant composition according to claim 6, which consists essentially of, by molecular weight percentage, 68–70% of $SiO_2$, 5.5–6.5% of $ZrO_2$, an oxide of copper and 6–8% of CaO.

* * * * *